(12) United States Patent
Willis et al.

(10) Patent No.: US 8,267,778 B2
(45) Date of Patent: Sep. 18, 2012

(54) VIDEO GAME FEEDBACK SYSTEM AND METHOD

(75) Inventors: Daniel Willis, Stittsville (CA); Dhananjay Godse, Kanata (CA); Victor Lonmo, Nepean (CA)

(73) Assignee: Google Inc., Mountain View, CA (US)

( * ) Notice: Subject to any disclaimer, the term of this patent is extended or adjusted under 35 U.S.C. 154(b) by 1141 days.

(21) Appl. No.: 11/300,384

(22) Filed: Dec. 15, 2005

(65) Prior Publication Data
US 2006/0128471 A1   Jun. 15, 2006

Related U.S. Application Data

(60) Provisional application No. 60/636,016, filed on Dec. 15, 2004, provisional application No. 60/636,877, filed on Dec. 20, 2004, provisional application No. 60/636,534, filed on Dec. 17, 2004, provisional application No. 60/636,537, filed on Dec. 17, 2004.

(51) Int. Cl.
*A63F 13/12* (2006.01)
*G06F 17/30* (2006.01)
*G06Q 40/00* (2006.01)

(52) U.S. Cl. ............................................. 463/29; 705/37

(58) Field of Classification Search ..................... 463/29, 463/40, 42–43; 726/26–33
See application file for complete search history.

(56) References Cited

U.S. PATENT DOCUMENTS

| | | | |
|---|---|---|---|
| 5,724,424 A | 3/1998 | Gifford | |
| 5,768,382 A * | 6/1998 | Schneier et al. | ............... 380/251 |
| 5,816,918 A | 10/1998 | Kelly et al. | |
| 5,941,772 A | 8/1999 | Paige | |
| 5,946,664 A | 8/1999 | Ebisawa | |
| 6,036,601 A | 3/2000 | Heckel | |
| 6,196,920 B1 | 3/2001 | Spaur et al. | |
| 6,285,985 B1 | 9/2001 | Horstmann | |
| 6,430,301 B1 * | 8/2002 | Petrovic | ........................ 382/100 |
| 6,442,259 B2 | 8/2002 | Culli et al. | |
| 6,513,052 B1 | 1/2003 | Binder | |
| 6,640,336 B1 | 10/2003 | Ebisawa | |
| 6,704,415 B1 | 3/2004 | Katayama et al. | |
| 6,745,236 B1 * | 6/2004 | Hawkins et al. | ............... 709/218 |
| 6,882,978 B2 | 4/2005 | Ebisawa | |
| 6,928,414 B1 | 8/2005 | Kim | |
| 7,085,733 B2 | 8/2006 | Ebisawa | |
| 7,249,383 B1 * | 7/2007 | McCully et al. | ................. 726/28 |
| 7,452,278 B2 * | 11/2008 | Chen et al. | ..................... 463/42 |
| 2001/0010059 A1 | 7/2001 | Burman et al. | |
| 2002/0004743 A1 | 1/2002 | Kutaragi et al. | |
| 2002/0059148 A1 | 5/2002 | Rosenhaft et al. | |
| 2002/0072413 A1 * | 6/2002 | Arias et al. | ..................... 463/42 |
| 2002/0082910 A1 | 6/2002 | Kontogouris | |

(Continued)

FOREIGN PATENT DOCUMENTS
EP   1 087 312 A2   3/2001

*Primary Examiner* — David L Lewis
*Assistant Examiner* — Werner Garner
(74) *Attorney, Agent, or Firm* — Fish & Richardson P.C.

(57) ABSTRACT

In order to track the behavior of a gamer with a virtual environment of a video game, the virtual environment is provided with a set of predetermined objectives. The completion of the predetermined objectives is monitored and recorded. This information is then provided to a game developer. In addition, comparing the record of the predetermined objectives with current game assets associated with the gamer serves to inhibit authorized duplication of game assets.

20 Claims, 3 Drawing Sheets

U.S. PATENT DOCUMENTS

| | | |
|---|---|---|
| 2002/0116263 A1 | 8/2002 | Gouge |
| 2002/0120589 A1 | 8/2002 | Aoki |
| 2003/0177187 A1* | 9/2003 | Levine et al. .................. 709/205 |
| 2004/0015608 A1 | 1/2004 | Ellis et al. |
| 2004/0043806 A1* | 3/2004 | Kirby et al. ....................... 463/6 |
| 2004/0073909 A1 | 4/2004 | Arimilli et al. |
| 2004/0116183 A1 | 6/2004 | Prindle |
| 2004/0128364 A1 | 7/2004 | Clark |
| 2004/0143852 A1* | 7/2004 | Meyers ......................... 725/133 |
| 2004/0221178 A1* | 11/2004 | Aaron et al. ................... 713/201 |
| 2005/0098955 A1* | 5/2005 | Rasmussen .................. 273/430 |
| 2005/0137015 A1* | 6/2005 | Rogers et al. ................... 463/42 |
| 2005/0246638 A1 | 11/2005 | Whitten |
| 2005/0255923 A1* | 11/2005 | Aoki ............................... 463/43 |
| 2007/0043616 A1 | 2/2007 | Kutaragi et al. |
| 2008/0102947 A1 | 5/2008 | Hays et al. |

* cited by examiner

VIDEO GAME FEEDBACK SYSTEM AND METHOD

This application claims benefit from U.S. Provisional Patent Application Nos. 60/636,016 filed Dec. 15, 2004; 60/636,877 filed Dec. 20, 2004; 60/636,534 filed Dec. 17, 2004; and 60/636,537 filed Dec. 17, 2004, the entire contents of which is incorporated herein by reference.

FIELD OF THE INVENTION

The invention relates to acquiring data regarding the users of computer software relating to gaming. More specifically, the invention seeks to provide information that will allow a software developer to enhance their gaming software based upon user interaction data.

BACKGROUND

Increases in the computing power available to consumers and business people have resulted in the use of a wide variety of new and complex software applications. In addition, the widespread adoption of the Internet, a broadband distributed public network, supports communication between various users via various devices. Further, the Internet allows users to update their software by contacting specific Internet addresses associated with the publishers of the their software and downloading updated and enhanced versions of their software.

These advances in computing have also supported tremendous growth in the adoption and play of video games. In the last decade, personal computer games have widely adopted the concept of connecting remote gamers and allowing them to play together, typically via an Internet data connection. Similarly, some game consoles support network data connections suitable for supporting gaming sessions featuring remote gamers.

The market for providing gaming hardware and software is very competitive and many games have a very brief shelf life. In addition, the increases in hardware and software capabilities have resulted in increasingly expensive and complex game development. That said, video games that are widely adopted are often remarkably profitable. With this in mind it is critical that a game developer understand their market. In some ways, the development of video games is often analogous to the design of toys in that, as the product is often designed to appeal to consumers that are in a different age group than the developer it is often difficult to predict what will be a successful and engaging video game experience versus an unappealing and unmemorable one.

In addition, in some very popular video games that support virtual persistent environments, it is known to hack certain game assets. As some gamers will participate in a game for an extended period of time just to acquire such a game asset, the unauthorized duplication (or hacking) of such game assets acts to reduce the appeal of these games and results in gamers playing the games for shorter periods of time. This is of particular concern when the gamers pay a monthly fee in order to participate in the virtual persistent environment.

It would be beneficial to provide comprehensive feedback information regarding the use of video game software. In addition it would be beneficial to provide enhanced control of the use of game assets.

SUMMARY OF THE INVENTION

The invention teaches a method comprising:
determining a set of predetermined objectives within a video game;
providing a video game session on a computing device;
receiving gamer input signals;
determining that an objective of the set of predetermined objectives is achieved in response to the gamer input signals;
upon determining that an objective of the set of objectives has been achieved:
storing data in a gamer history record, the data relating to the achievement of the objective;
establishing a data communications link between the computing device and a feedback server via a public network;
uploading data relating to the gamer history record from the computing device to the feedback server.

The invention provides a non-volatile storage medium comprising instructions for being executed by a computing device, the instructions comprising:
providing a video game session on the computing device;
receiving a set of predetermined objectives from the non-volatile storage medium;
receiving gamer input signals;
determining that an objective of the set of predetermined objectives is achieved in response to the gamer input signals;
upon determining that an objective of the set of objectives has been achieved:
storing data in a gamer history record, the data relating to the achievement of the objective;
establishing a data communications link between the computing device and a feedback server via a public network;
uploading data relating to the gamer history record from the computing device to the feedback server.

Further, the invention teaches a method comprising:
generating a virtual environment for supporting a video game session;
providing predetermined objectives within the video game session;
receiving first gamer input signals from a first gamer;
determining that a first objective of the predetermined objectives has been achieved in response to the gamer input signals;
in response to determining that the first objective has been achieved:
providing a game asset within the virtual environment;
receiving second gamer input signals corresponding to associating the game asset with a second gamer;
in response to receiving the second gamer input signals:
i. providing an entry within an inventory database associated with the second gamer, the entry indicative of the game asset;
ii. providing data to a gamer history record indicative of providing the entry of the game asset, the gamer history record associated with the second gamer.

BRIEF DESCRIPTION OF THE DRAWINGS

The invention is now described with reference to the drawings in which.

DETAILED DESCRIPTION OF THE INVENTION

Figure 1:
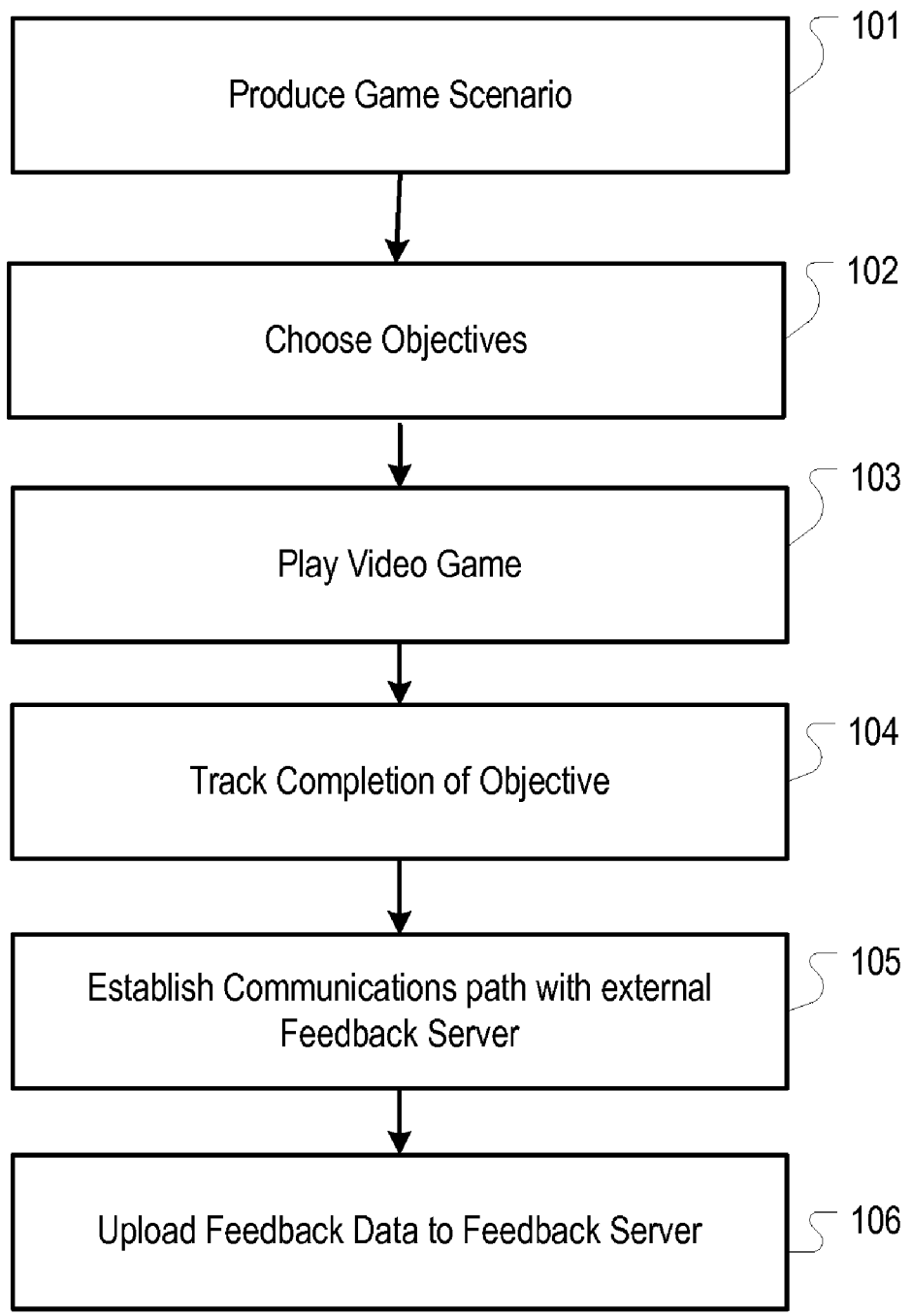
FIG. 1 is a flowchart according to a first embodiment of the invention that describes a method of tracking how gamers play a video game.

The prior art teaches the use of conventional marketing techniques to provide user information regarding gamer behaviour. For example, it is common practice for a video game to be provided with a user registration card. The user registration card readventures that the gamer provide various information regarding, for example, what types of video games they play, how many new video games they play in a year and, how many hours of video game playing they do in a week to name a few. With the widespread adoption of the Internet, such registration is often carried out in an electronic format. While user registration systems provide valuable data, it is apparent that these systems are limited. Specifically, it is unlikely that a gamer keeps an accurate record of how often they play a video game. Similarly, a gamer might have difficulty describing the games they play as "simulations" versus "first person shooter" depending on the type of game. Clearly, the appeal of certain games is that they do not fall easily within such categories. Most importantly, this information is typically provided before the gamer plays the game. The software developer would like to know if the user enjoys the game, if certain parts of the game were more enjoyable than others, which portions of the game the gamer is likely to play again and, if the game provides a challenge without being overly frustrating. Typically, this information is simply not available when the gamer registers their software because they typically have yet to play the game. In addition, some gamers do not feel a desire to register their software. Playing a video game is a fun, exciting experience and registering software typically is not.

Thus, while the data collected using traditional feedback information processes is certainly better than not obtaining any data, it is clear that the data provided in a prior art registration process has a adventureionable degree of accuracy and is not very detailed.

Some embodiments of the invention are provided to overcome this problem by providing feedback regarding game play. For example, a suitably designed video game stores specific data regarding what predetermined objectives a gamer achieves.

The prior art teaches providing feedback data associated with gamer interaction with a virtual environment of a video game. For example in U.S. Pat. No. 6,036,601 by Heckel, issued 14 Mar. 2000, feedback data indicative of the presentation of an advertisement during a video game session is provided to an external server. More specifically, Heckel teaches recording a duration of time in which an advertisement is displayed and, a size in pixels of the advertisement among other data. Similarly, US patent application 2002/0120589 A1 by Aoki, published 21 Aug. 2002 teaches the notion of providing feedback data regarding the quality of an advertising impression. Specifically, Aoki provides feedback data regarding the presentation of an advertisement in a video game, and the relative size of the advertisement in comparison with the total viewing area of a video display that it appears in. Aoki then suggests that the advertiser pay the video game developer an amount associated with a summation of the impressions.

Referring to FIG. 1, a flowchart according to a first embodiment of the invention is provided. During development of a video game, a game scenario is implemented 101. Specific objectives are provided within the game scenario. These objectives are chosen 102 in such a way that data regarding the completion or failure to complete specific objectives is sufficient to determine how a gamer is progressing through the game scenario. When the video game is played 103 the completion of these objectives is tracked 104 and stored as feedback data. During a gaming session, the gamer establishes a data connection to a feedback server via a public network 105, such as the Internet. The feedback data is uploaded from the computing device supporting the gaming session to feedback server at 106. Once the feedback data is made available to the game provider, the game provider is able to use it to determine a wide variety of information regarding how the gamer plays the game. For example, in a game with a variety of levels it is not uncommon that a gamer will replay a specific set of levels and not replay others. Thus, one objective within the game that is optionally reported is the completion of a level within a virtual environment of the video game. A given portion of the video game supports a plurality of predetermined objectives. The objectives are ideally chosen in order to determine if gamers have difficulty with specific portions of a given level.

The reporting of the achievement of an objective is optionally provided with other related data. For example, in a game in which a gamer navigates a character or an character within a virtual environment, when the gamer views a map, an objective is recorded along with a length of time that the gamer is viewing the map. Similarly, if the gamer chooses to pause the game, a duration and frequency of pausing is optionally reported. A person of skill in the art will appreciate that a wide variety of data relating to other interactions of the gamer with the virtual environment is optionally reported such as score data, shooting accuracy, remaining fuel, average speed, and so forth depending in part on the type of game.

A person of skill in the art will also appreciate that gaming software is optionally provided with a version identifier. The identifier provides information regarding the version of the software. For example, a first version of the software supports a first language while a second version supports another language. If progression within the game involves clues in the form of text or audio messages, then a gamer is likely to experience difficulty if the translation of the text and audio messages is incorrect or ambiguous. Using a method that incorporates tracking a language version of the video game, quickly and easily identifies where a frustration is occurring and allows such errors to be conveniently located and fixed. Further, the information is beneficial to the game provider as it helps to determine desirable features and options for future versions of the video game. Clearly, it is in the best interests of the game developer to provide a high quality gaming experience to encourage garners to purchase other game software from the same game provider, such as expansion packs, sequels and related games.

Preferably, the game play data reported is other than merely score data. While missing the opponent may not adversely affect the score earned by the gamer, a statistic regarding a percentage of hits is optionally maintained. In addition, many video games feature a variety of options for achieving a same score. Thus, it is clear that providing score data to a server does not convey information regarding how the gamer achieved their score, and more specifically, game play progression—what portions of the video game the gamer is playing to get their score.

Figure 2:
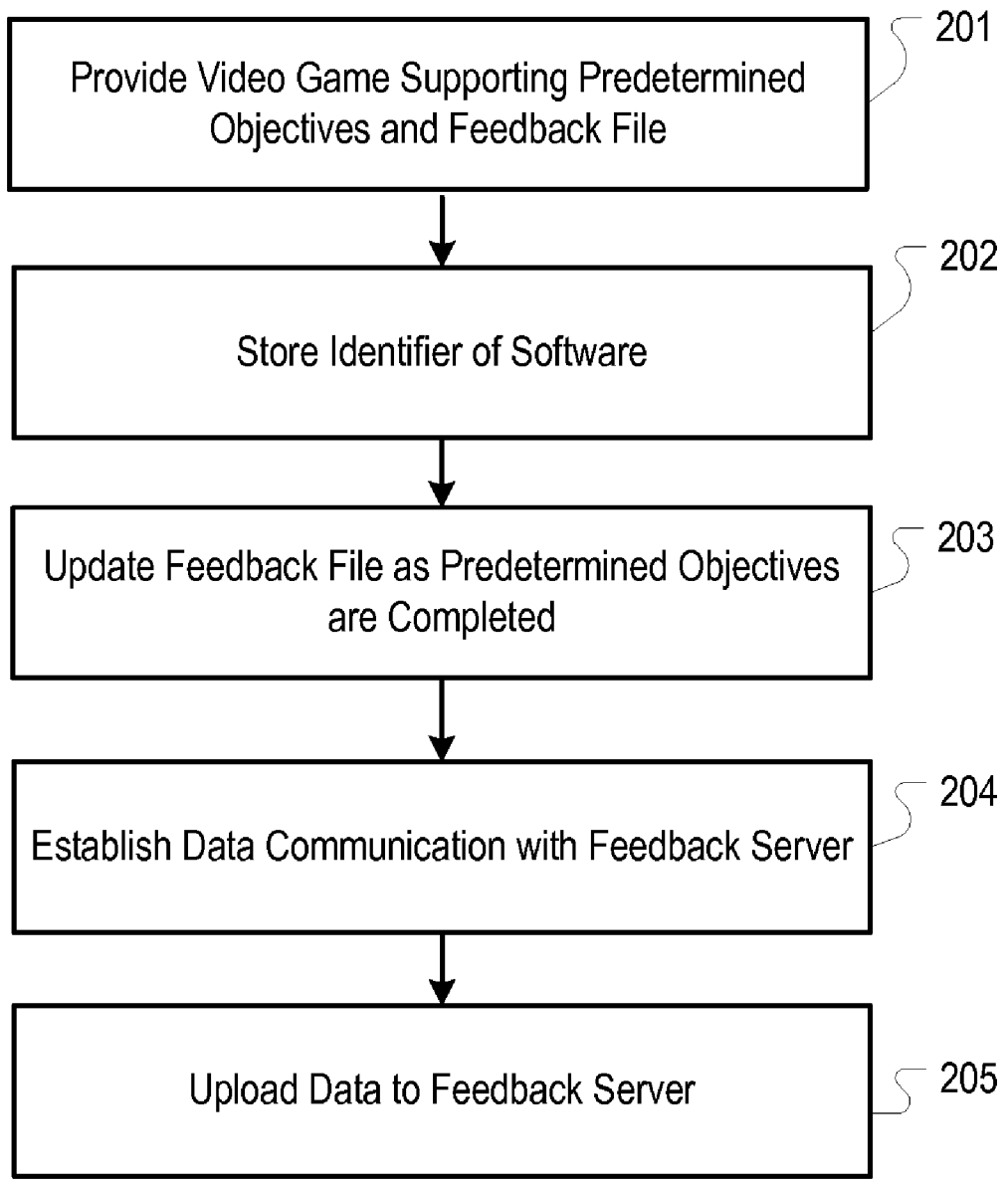
FIG. 2 is a flowchart according to a second embodiment of the invention that describes a method of tracking gamer interaction with a video game in which the video game comprises an identifier; and,
FIG. 3 is a flowchart according to a third embodiment of the invention intended to inhibit unauthorized duplication of game assets.

Referring to FIG. 2, a flowchart according to a second embodiment is shown. A software program is provided with an identifier. The identifier serves to distinguish a given copy of the software from otherwise identical copies of the software, similar to a serial number. Thus, it is known to provide an English language version of a video game and a German language version of the same game. While these versions of the video games are closely related it is apparent that they are different and a language identifier is optionally provided, for example, to ensure that the correct versions of patches are provided. Here, the identifier, different from the language identifier discussed above, is used to distinguish copies of video game software that are functionally equivalent and thus, distinguished from one another by the identifier. Using the identifier, information regarding use of the software is attributed to a specific copy of the software. Optionally, it is assumed that each copy of the software is used by only one gamer. In use, a video game is programmed to include a set of predetermined objectives and a feedback record 201. A non-volatile storage medium having the video game software encoded thereon comprises an identifier of the software that distinguishes the software from other copies of the software 202. As the gamer achieves predetermined objectives, the feedback record 201 is updated 203. During a gaming session, the computing device establishes a data connection with a feedback server 204. Feedback data indicative of the identifier of the software and data from the feedback record is provided from the computing device to the feedback server 205. Optionally, to inhibit unauthorized reviewing of the feedback data, the feedback data is secured, for example by being encrypted. As the feedback data provided to the feedback server is associated with a specific copy of the video game software, a wide variety of metrics associated with use of the software is determinable. For example, general statistics are formed determining that users who begin using the software within the first week of release are more or less likely to play the video game three months after purchase than gamers who purchase the game six months after it is commercially available based on accurate feedback data. Further, user specific statistics are also determinable such as a number of gamers reaching a particular level within a predetermined period of time or a number of gamers permanently stuck or stuck for a long time at a particular point in the game. The information is very important in terms of determining marketing efforts to promote future video games.

When, the computing device has a hardware identifier—a serial number encoded electronically therein, the feedback data optionally comprises data indicative of the hardware identifier. When the hardware identifier is provided along with the identifier of the software, feedback data comprising a same software identifier and different hardware identifiers received simultaneously or from geographically disparate locations within close temporal proximity is likely to indicate software piracy and/or resale. Thus, using the identifiers for the hardware and software, a number of active unmonetised copies of the software is estimatable. This information is useful in determining the effectiveness of the overall piracy protection of the software and for determining a cost on a per game and per platform basis of the piracy.

Figure 3:
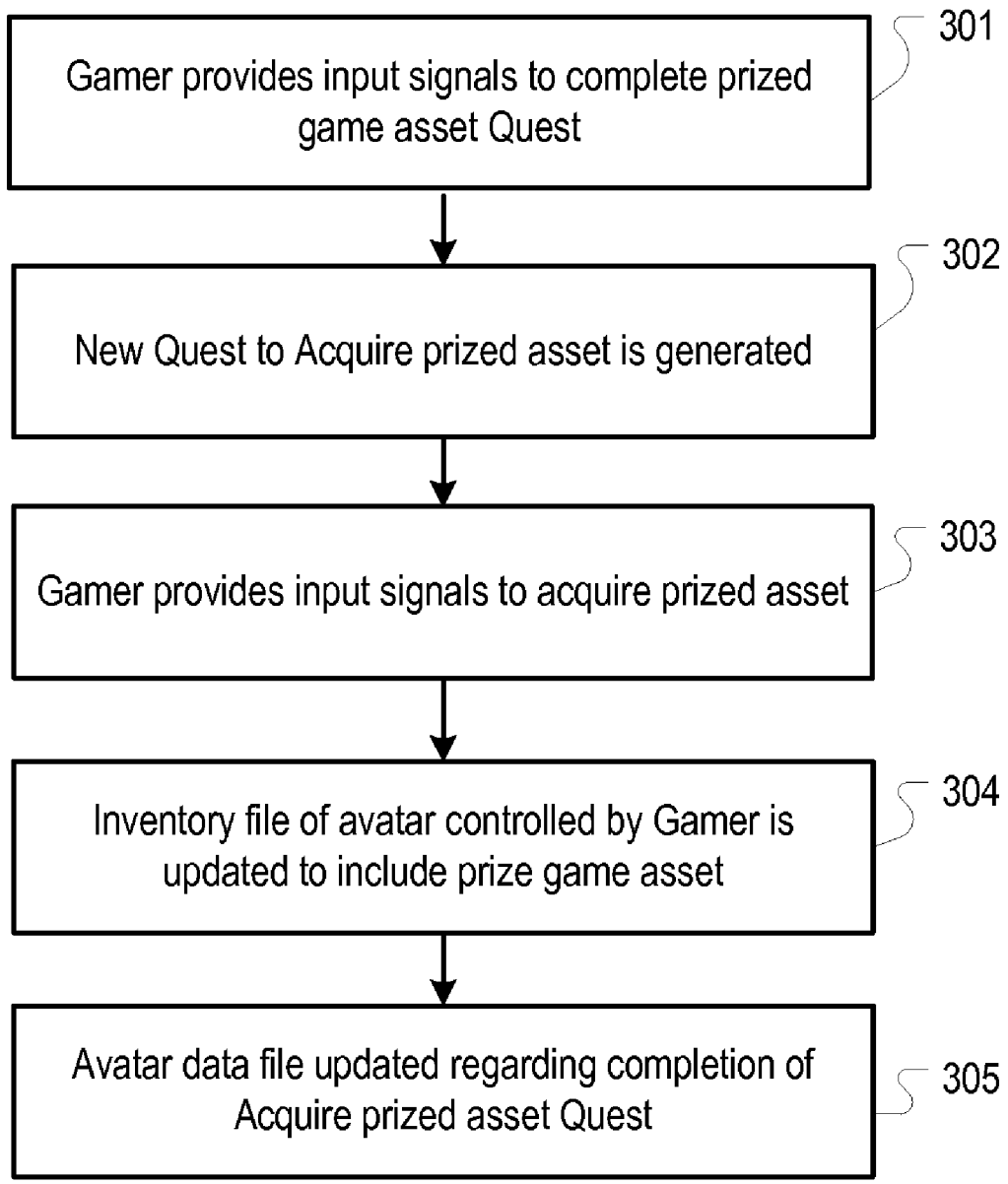

Referring to FIG. 3 a simplified flowchart according to a third embodiment is shown supporting management of game assets as related to game progression. Some games having persistent gaming environments feature specific game assets attributed to specific gamer controlled characters or characters. Typically, these assets are made available to the gamer during and after the achievement of an adventure or goal, in which a gamer controlled characters is successful in an interaction between itself and the gaming environment. The desirability of the game asset provided upon completion of the adventure usually increases as a relative difficulty of the adventure increases. As such, game assets are often desirable to gamers. It is not uncommon that gamers seek to "purchase" game assets by trading other game assets for a specific game asset they want. In addition it is known that some game assets are sold for real money either on Internet auction web pages or through other sales mechanisms. Due to the desirability of these game assets, it is also known for hackers to produce unauthorized duplicates of game assets. By making unauthorized duplicate game assets generally available, gamers have less incentive to complete difficult activities within the video game and, consequently, the game play experience is changed rendering gamers more likely to lose interest in the game. As many of these games charge monthly subscription fees, the unauthorized duplication of game assets potentially represents significant lost revenue to the game publisher who could otherwise be selling the game assets themselves. By associating authorization data with each asset, it is possible to reduce abuse and unauthorised duplication of assets. The authorization data is based on a historical game play progression experienced by the gamer. Specifically, a game asset is provided a record of specific adventures associated with the game asset and of specific adventures required to benefit from the game asset. This record is stored and reported. During a gaming session, a first party comprises first, second and third characters associated with first, second and third gamers, respectively. Each of the first, second and third characters has a character data record associated therewith. The party completes a prized asset adventure 301 and the prized game asset is provided within the virtual environment in close proximity to one of the three characters. Another adventure to acquire the prized asset is provided 302. The prized game asset is only useable by a single character at a given time. The first gamer provides input signals for the first character to acquire prized game asset 303. An inventory record associated with the first character is updated to acknowledge the presence of the prized game asset 304. In acquiring the prized game asset, the first character data record is updated to comprise a prized game asset record to acknowledge the completion of the acquire prized asset adventure 305. Optionally, the prized game asset record associated with the first character data record is transparent to the gamer controlling the character. In addition, the prized game asset record comprises encrypted unique data. For example, in a video game in which each character has a unique name, the name of the character is encrypted and provided within the prized game asset record. Further, the encrypted data comprises data associated with a unique identifier of the character and prized game asset. A person of skill in the art will appreciate that a hash of the unique name is optionally used. When it is desired to transfer the prized game asset from a first character to a second character the transfer is carried out in a transfer environment of the virtual environment. The transfer environment supports a transfer routine. The routine identifies the game asset to be transferred as a prized game asset 301. The transfer routine then reviews the character data record of the character that currently has the prized game asset. If the character data record does not have a prized game asset record associated with the prized game asset then a flag indicative of a suspicious game asset is set. Similarly, if the character data record has a prized game asset record but the prized game asset record is determined to be invalid then the suspicious game asset flag is set. If the character data record has a valid prized game asset record then a transfer event is supported. The transfer event removes data indicative of possession of the prized game asset from the first character data record and provides corresponding data to the second character data record. The second character data record comprises a new prized game asset record with valid encrypted data corresponding to both the second character and the prized game asset. Since the prized game asset record is encrypted and associated with both of the character that has the prized game asset and the prized game asset itself, it is difficult to make duplications of the prized game asset that are suitable for trading absent detailed knowledge of how the encrypted prized game asset record is generated. In this way, unauthorized duplication of game assets is inhibited.

Optionally, when a gamer acts to introduce a character into a gaming environment, a function checks the game assets associated with the character prior to introducing the character into the gaming session. Alternatively, gamers having an account history can create new characters within their accounts with predetermined asset support without completing the necessary adventures. Then, the game provider sells assets to these characters or they share assets with their current group of gamers—their friends.

Clearly, if the game assets are the property of an operator of the virtual environment then the operator of the virtual environment has the option of manipulating the various data records. Thus, when the flag indicative of a hacked game asset is set the operator optionally deletes any reference to the hacked game asset with regards to that character record. Alternatively, the character record found to be in possession of the hacked prized game asset is also removed.

This serves to provide enhanced control of game assets within a virtual gaming environment. A person of skill in the art will appreciate that other aspects of the video game are protectable in a similar fashion. For example, in many video games it is known to attribute a "level" to a character. The level typically is indicative of some of the capabilities of the character. In addition the level increases as the character completes game objectives. Here, the use of character history data records associated with the characters facilitates management of these characteristics. When a character completes a game objective that results in a change in level, a change level routine is initiated. The change level routine stores information associated with the change in level in a level record. Optionally, such information comprises a value of time within the virtual environment when the change in level occurs. In addition the information comprises information uniquely associated with the instance of the character within the virtual environment. Thus, each character of the virtual environment has a unique identifier and data associated with the identifier of the character is stored, for example a unique character name. When a character enters a new gaming session, the level record of the character is verified for authenticity. If the level record indicates that the level record is valid, that character is permitted to participate in the gaming session. If the level record is not valid, then the character is optionally prevented from participating in the gaming session. Clearly, the way in which characters that display evidence of hacking are treated is subject to the discretion of an administrator of the virtual environment. In this way, a hacker is prevented from simply copying level data associated with a first high level character and attributing that level data to a lower level character to hack the lower level character to the higher level. Further alternatively, the level data record is associated with the subscriber therefore allowing them to create new characters up to a level at which they have and are accustomed to playing.

Storage data records associated with completion of specific game objectives are used in gathering of valuable feedback data and to inhibit the unauthorized duplication of game assets. By providing feedback data records comprising character data records, one or more data records are optionally used to track a wide variety of gamer interactions within the video game. In addition, transferring this data within a single record provides information to the game provider regarding when and how a hacker has attempted to corrupt the video game. More specifically, a hacker is likely to attempt hacking a video game numerous times in a relatively similar fashion. Using the teachings of the invention a skilled programmer provides a video game that has substantially enhanced security regarding resistance to hacking, the enhanced security providing information for use in further enhancing security after game deployment. Specifically, hacked records are recognizable and, optionally, accounts that support hacked records are carefully monitored for other efforts to hack the video game. These advantages are achieved while also receiving other benefits.

For example, tracking of game play is useful for providing hints, help messages, software patches, software upgrades, design of future games, providing service offerings, providing serial game offerings, and generally for improving gamer enjoyment of the gaming environment of the overall gaming experience.

Though encrypted is used above when referring to obfuscating of data, a more accurate term is ciphered which includes encrypting, decrypting, digitally signing, hashing, and so forth.

The embodiments of the invention are illustrative in nature. Numerous other embodiments will be apparent to one of skill in the art without departing from the spirit and scope of the invention.

What is claimed is:

1. A computer-implemented method, comprising:
receiving first gamer input signals from a first gamer, the first gamer input signals indicating gaming actions within a virtual environment;
determining, by one or more computers, that a first predetermined objective has been achieved in response to the first gamer input signals;
in response to determining that the first objective has been achieved:
providing a first game asset record to the first gamer within the virtual environment, the first game asset record identifying a game asset and a game asset history, the game asset history identifying the first gamer, the achieved objective, and a level the first gamer must have achieved to benefit from the game asset; and
updating a first character record associated with the first gamer to identify the achieved objective and to include the first game asset record;
receiving second gamer input signals from the first gamer, the second gamer input signals indicating transfer of the game asset from the first gamer to a second gamer; and
in response to receiving the second gamer input signals:
before allowing the transfer, verifying, by the one or more computers that the first character record includes a corresponding game asset record and verifying that the first game asset record identifies the game asset and the game asset history is consistent with data in the first character record, wherein verifying that the game asset history is consistent with data in the first character record comprises verifying that the first character record indicates that the first gamer has achieved the level identified by the game asset history.

2. The method of claim 1 wherein, at least a portion of the data within the first character record is ciphered.

3. The method of claim 2, wherein each gamer is uniquely associated with a corresponding character record identified by a unique identifier.

4. The method of claim 2, wherein each game asset record is uniquely associated with a corresponding character record identified by a unique identifier.

5. The method of claim 4 wherein the association between the game asset record and the corresponding character record is ciphered.

6. The method of claim 1, further comprising:
upon successful verification, providing the first character record to the second gamer and, updating a second character record associated with the second gamer to include an updated first game asset record, the updated first game asset record identifying both the game asset and the second gamer; and
upon unsuccessful verification, flagging the transfer as a likely fraudulent transfer.

7. The method of claim 6, further comprising:
upon unsuccessful verification, reviewing the first character record for indications of data manipulation corresponding to hacking.

8. The method of claim 6 wherein the second gamer and the first gamer are the same player acting as two different characters in the virtual environment.

9. The method of claim 6, further comprising:
monitoring the first character record for indications of hacking 10. The method of claim 1, wherein verifying that the game asset history is consistent with data in the first character record comprises determining that both the first character record and the game asset history identify the first gamer and the achieved objective.

11. A non-transitory computer-readable medium, having instructions stored thereon, which, when executed by a processor, cause the processor to perform operations comprising:
receiving first gamer input signals from a first gamer, the first gamer input signals indicating gaming actions within a virtual environment;
determining that a first predetermined objective has been achieved in response to the first gamer input signals;
in response to determining that the first objective has been achieved:
providing a first game asset record to the first gamer within the virtual environment, the first game asset record identifying a game asset and a game asset history, the game asset history identifying the first gamer, the achieved objective, and a level the first gamer must have achieved to benefit from the game asset; and
updating a first character record associated with the first gamer to identify the achieved objective and to include the first game asset record;
receiving second gamer input signals from the first gamer, the second gamer input signals indicating transfer of the game asset from the first gamer to a second gamer; and
in response to receiving the second gamer input signals:
before allowing the transfer, verifying that the first character record includes a corresponding game asset record and verifying that the first game asset record identifies the game asset and the game asset history is consistent with data in the first character record, wherein verifying that the game asset history is consistent with data in the first character record comprises verifying that the first character record indicates that the first gamer has achieved the level identified by the game asset history.

12. The computer-readable medium of claim 11, wherein at least a portion of the data within the first character record is ciphered.

13. The computer-readable medium of claim 12, wherein each gamer is uniquely associated with a corresponding character record identified by a unique identifier.

14. The computer-readable medium of claim 12, wherein each game asset record is uniquely associated with a corresponding character record identified by a unique identifier.

15. The computer-readable medium of claim 14, wherein the association between the game asset record and the corresponding character record is ciphered.

16. The computer-readable medium of claim 11, the operations further comprising:
upon successful verification, providing the first character record to the second gamer and, updating a second character record associated with the second gamer to include an updated first game asset record, the updated first game asset record identifying both the game asset and the second gamer; and
upon unsuccessful verification, flagging the transfer as a likely fraudulent transfer.

17. The computer-readable medium of claim 16, the operations further comprising:
upon unsuccessful verification, reviewing the first character record for indications of data manipulation corresponding to hacking.

18. The computer-readable medium of claim 17, wherein the second gamer and the first gamer are the same player acting as two different characters in the virtual environment.

19. The computer-readable medium of claim 16, the operations further comprising:
monitoring the first character record for indications of hacking 20. The computer-readable medium of claim 11, wherein verifying that the game asset history is consistent with data in the first character record comprises determining that both the first character record and the game asset history identify the first gamer and the achieved objective.

* * * * *